United States Patent [19]

Bhagwat et al.

[11] Patent Number: 5,268,630
[45] Date of Patent: Dec. 7, 1993

[54] METHOD AND APPARATUS FOR VARYING THE SAMPLE RATE OF A FAST BATTERY CHARGER

[75] Inventors: Pradeep M. Bhagwat; Daniele C. Brotto, both of Baltimore; Richard T. Walter, Baldwin, all of Md.

[73] Assignee: Black & Decker Inc., Newark, Del.

[21] Appl. No.: 878,103

[22] Filed: May 4, 1992

[51] Int. Cl.⁵ ............................................. H02J 7/04
[52] U.S. Cl. ..................................... 320/20; 320/37
[58] Field of Search ................... 320/20, 27, 30, 37, 320/39, 40

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |
| 4,418,310 | 11/1983 | Bollinger | 320/39 |
| 4,639,655 | 1/1987 | Westhaver et al. | 320/14 |
| 4,677,363 | 6/1987 | Kopmann | 320/44 |
| 4,767,977 | 8/1988 | Fasen et al. | 320/20 |
| 4,806,840 | 2/1989 | Alexander et al. | 320/20 |
| 5,027,294 | 6/1991 | Fakruddin et al. | 364/550 |

Primary Examiner—Steven L. Stephan
Assistant Examiner—Thomas M. Dougherty
Attorney, Agent, or Firm—Harness, Dickey & Pierce

[57] ABSTRACT

This invention discloses a method and apparatus for rapidly charging a battery by monitoring the voltage of the battery and changing the effective sampling rate of the battery voltage during the charging sequence. More particularly, a first disclosed embodiment of the battery charging system takes voltage readings of the battery as it is being charged at a predetermined rate and stores the voltage values in a first-in, first-out stack in the order in which they are taken. Therefore, a stack of consecutive data samples spaced in time is created. During an interval in the charging sequence where the rate of increase in battery voltage is relatively low, the charging system retrieves voltage values from the stack which are widely separated in time to calculate a slope of the charging profile to determine the status of the charging sequence. During a second interval of the charging sequence when the rate of increase in battery voltage is relatively high, the effective sampling rate is reduced by taking sample points from the stack which are closer together in time. In this manner, the effective sampling rate of the charging system is changed to improve the effective signal-to-noise ratio of the system during the first interval while maintaining an appropriately fast response time during the second interval. An alternative embodiment is disclosed which changes the rate at which the battery voltage is sampled from the first to the second interval in the charging sequence.

19 Claims, 2 Drawing Sheets

METHOD AND APPARATUS FOR VARYING THE SAMPLE RATE OF A FAST BATTERY CHARGER

BACKGROUND OF THE INVENTION

1. Field of the Invention

This invention relates generally to a method and apparatus for rapidly charging a battery by monitoring a parameter associated with the battery, such as voltage, and, in particular, by varying the effective sample rate of the monitored parameter during different phases of the charging process in accordance with the relative rate of change in the value of the monitored parameter.

2. Discussion of the Related Art

For a variety of well known reasons, such as reducing the number of disposable batteries and reducing the possibility of being without batteries having adequate charge, it is desirable to provide a rechargeable battery or battery pack. It is further desirable to be able to recharge a chargeable battery or battery pack as fast as possible. Battery chargers which recharge chargeable batteries very rapidly, typically on the order of 15 minutes, are known in the art. Because of the high amount of current required to be applied to a rechargeable battery in an uncharged state in order to recharge it rapidly, it is extremely important to terminate the charging procedure before the battery pack is overcharged. Charging beyond the full battery charge leads to battery deterioration and, over an extended number of overchargings, to battery failure.

A number of different charging systems are known in the art to rapidly charge rechargeable batteries which include methods for detecting full battery charge in order to eliminate, or substantially decrease, the possibility of overcharging the batteries. Examples of the more effective prior art rapid charging systems are disclosed in U.S. Pat. Nos. 4,388,582 and 4,392,101, both issued to Saar et al., herein incorporated by reference and assigned to the same assignee as the present invention. The specific subject matter of the Saar et al. patents is directed to a quick charging technique which analyzes the charging of a battery by noting inflection points which occur in a charging curve representing the voltage increase of the battery with respect to time. The inflection points indicate areas in the charging curve which reliably separate different regions of electrochemical changes in the battery during the charging sequence. By determining the specific inflection points in the charging curve, it is possible to accurately terminate the rapid charging when the battery receives full charge.

Although the inflection point analysis technique has met with overall success, there is still room for improvement of these types of devices. In one specific area, random noise in the battery voltage signal monitored during the charging sequence may prematurely indicate an inflection point in the charging sequence, and possibly even prematurely indicate maximum charge. More particularly, as the charging system measures the battery voltage during the charging sequence in order to determine the slope of the charge curve to detect the inflection points, random noise may indicate a change in the slope which appears to but does not represent an actual inflection point. In regions of minimal voltage charge in the charging sequence, noise will obviously have the most destructive effects. Consequently, it is generally desirable to provide a relatively long sampling rate in regions where the voltage curve is relatively flat in order to increase the effective signal-to-noise ratio of the sampled signal.

Once the charging sequence enters a high slope region, the voltage increases fairly rapidly such that a relatively long sampling rate is no longer desirable and may in fact cause the optimum termination point to be missed. Consequently, it is desirable to have a relatively fast sample rate in the high slope region. Since the prior art charging curve analysis techniques have generally maintained a constant sampling rate throughout the charging process, there has been a tradeoff between an appropriate sample rate for the flat slope region and an appropriate sample rate for the high slope region.

Accordingly, it is the primary object of the present invention to overcome these disadvantages and provide a fast charging device which incorporates a relatively long effective sample rate in the flat slope region of a charging sequence and a relatively short effective sample rate in the high slope region.

SUMMARY OF THE INVENTION

This invention discloses an inflection point analysis fast battery charging system which monitors the charging sequence of a battery at an effective variable sample rate. In one particular embodiment, the charging system samples the battery voltage at a relatively long sample rate during the slow voltage change region of the charging sequence, and once an inflection point is detected between the slow voltage change region and the rapid voltage change region, the system shortens the sampling rate in order to provide a more desirable sample rate for the rapid change region. More particularly, a voltage sample taken from a battery being charged is pushed onto a data stack in the memory of a microcomputer associated with the charging system. As a new voltage sample is pushed onto the stack, the oldest voltage sample is pushed off of the stack and discarded. Voltage samples are taken from the stack in order to calculate the slope of the charge curve to identify the inflection points. When the inflection point between the flat slope region and the high slope region is encountered, the microcomputer increases the sample rate by pushing voltage values onto the stack at a faster rate, thus providing data points closer together in time for measuring the slope of the charging curve.

In an alternate embodiment, the actual sampling rate is maintained constant throughout the charging sequence, but the "effective" sampling rate between the low slope region and the high slope region is altered. In particular, while the charging sequence is within the low slope region of the charging curve, the microcomputer selects sample values from the stack which are spaced in time relatively far from each other, thus in essence providing a relatively long sample rate. Once the charging device determines that the charging process has entered the high slope region, the microcomputer then selects sample values from the stack which are closer together in time, thus providing a shorter effective sample rate. Consequently, the effective sample rate can be desirably adjusted in order to provide an improved signal-to-noise ratio in the low slope region, and a more rapid sampling rate in the high slope region, without having to alter the actual sample rate.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments concerning fast battery charging is merely exemplary in nature and is in no way intended to limit the invention or its application or uses.

Figure 1:
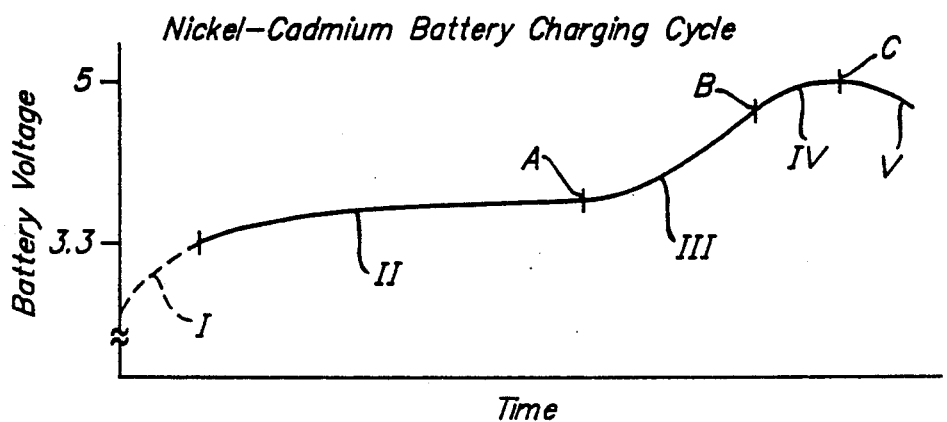
FIG. 1 is a voltage-time charging curve for a nickel-cadmium battery.

As disclosed in the Saar et al. patents, a typical voltage-time curve of a charging sequence of a nickel-cadmium (NiCad) battery is shown in FIG. 1. It is noted that the discussion herein is directed to charging a single battery; however, it is equally applicable to a series of batteries as would be found in a battery pack. As the battery is being charged, the voltage continuously rises as indicated by the curve until it reaches a desirable maximum charge point. Although the specific values of the curve may differ from battery to battery, the general shape of the curve is typical for all nickel-cadmium batteries. Likewise, each other type of rechargeable battery known in the art will have a typical voltage-time curve indicative of its type and, as such, the process discussed below is applicable to any of these other types.

As shown, the voltage-time curve can be separated into five distinct regions. Region I represents the beginning of the charging sequence just after the battery is initially attached to the charger and the charging begins. This region is represented by a dotted line due to the fact that the voltage characteristics in this region are somewhat unreliable and may vary from battery to battery in accordance with its prior history of being charged and discharged and its present state of discharge. Additionally, this region is of little importance in the charging sequence since it is generally traversed within a relatively short period of time (usually between 30 to 120 seconds) after the start of the charging sequence.

After the charging sequence passes through region I, the charging curve will enter a more stable region of region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point A in the curve. Inflection point A represents a transition from region II to region III, and is noted by a point where the slope of the curve changes from a decreasing rate to an increasing rate.

Region III is the region in which the battery voltage begins to increase rapidly with respect to time, thus representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as inflection point B.

Region IV represents the fully charged region between the inflection point B and the peak of the charging curve represented by point C. The charging voltage only stabilizes at point C for a very short period of time. Consequently, if charging continues, the additional heating within the battery will cause the voltage of the battery to decrease and in addition may cause damage to the battery.

The Saar et al. patents disclose a method of analyzing the battery voltage versus time-charging curve by detecting the inflection points in curve in order to determine the appropriate time to terminate the fast charge process. By measuring the slope of the charge curve at a predetermined sampling rate, it is possible to first determine inflection point A and then begin looking for inflection point B. Since the sampling period is constant, the calculation of the slope is merely a subtraction of the most recent voltage sample from a previous voltage sample. Once inflection point B is determined, the battery is fully charged and the charging sequence can be discontinued prior to point C being reached, thus eliminating overcharging.

Figure 2:
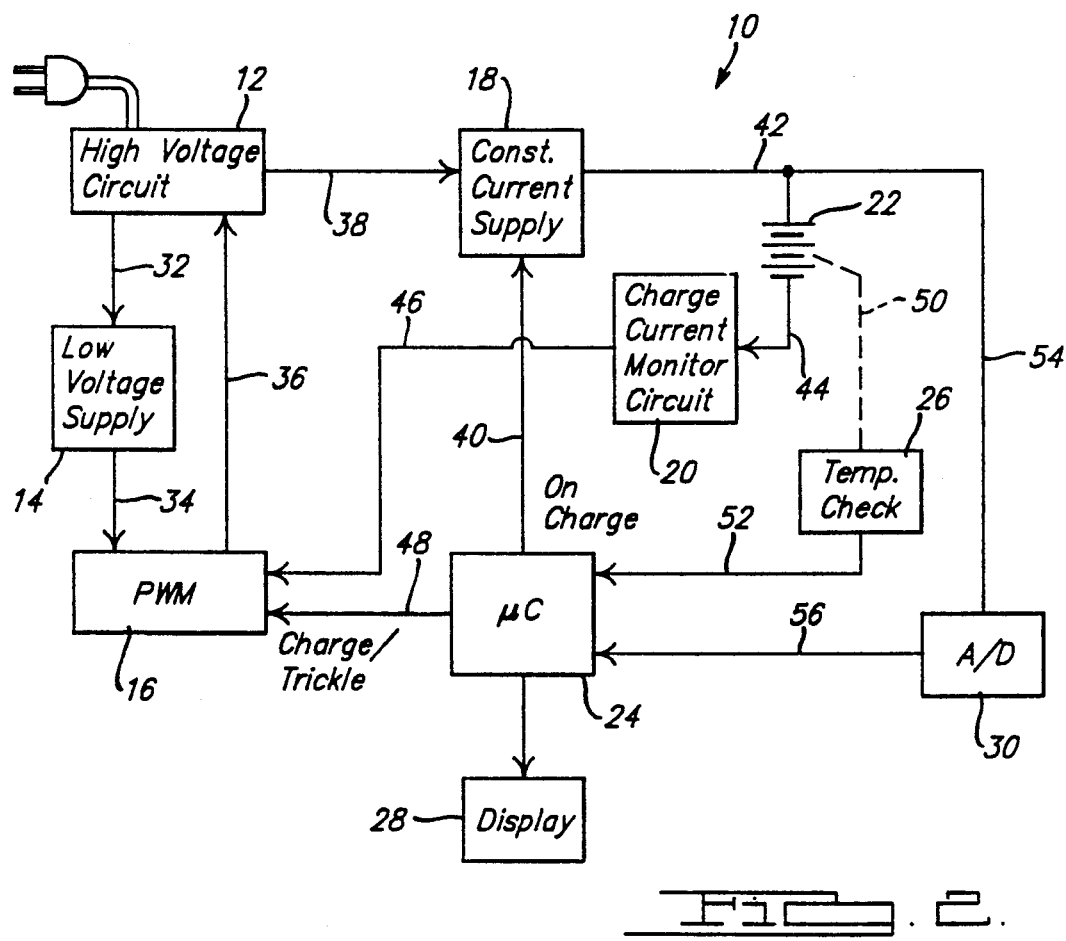
FIG. 2 is a schematic block diagram showing the major operational and control circuitry of a fast battery charging system.

The basic circuit components operable to be used in an inflection analysis fast battery charger will first be discussed. It is noted that these components are illustrated by way of a non-limiting example as other circuit configurations will be equally applicable. Turning to FIG. 2, a half bridge-type power supply circuit 10 is shown in a block circuit diagram. Circuit 10 includes a high voltage input circuit 12 for supplying high voltage to some components of the circuit 10, a low voltage power supply circuit 14 for supplying a low voltage supply to other components of the circuit 10, a pulse width modulation oscillator circuit 16 for generating a high frequency output to be used as a control input for the high voltage circuit 12, a constant current supply circuit 18 for providing a constant current supply to a battery 22 to be charged, and a charge current monitoring circuit 20 for monitoring the charge current rate of the battery 22 and for providing a feed-back signal to the pulse width modulation circuit 16 to desirably vary the control signal provided to the high voltage circuit 12. A microcomputer 24 is incorporated for controlling the charging scheme. Other circuit components of the circuit 10 include an optional temperature check circuit 26 which monitors the temperature of the battery 22, and a digital display circuit 28 for providing an indication to the operator of the various parameters of the charging process. Additionally, an analog-to-digital converter 30 is provided for converting the analog battery voltage signal from the battery 22 to a digital signal suitable for processing by the microcomputer 24.

The high voltage circuit 12 receives a 120-volt alternating current (AC) generally from a standard outlet. The alternating input signal is rectified and filtered to produce a smooth DC voltage of approximately 150 volts. The AC input signal is also applied, through a transformer (not shown), to the low voltage supply circuit 14 along line 32. The low voltage supply circuit 14 rectifies the AC signal and applies it to certain voltage regulator circuits (not shown) to provide regulated 5-volt and 15-volt outputs for the other circuit components. The various 5-volt and 15-volt supply lines to the other circuit components of the circuit have been omitted for clarity.

The pulse width modulator (PWM) oscillator circuit 16 receives a 15-volt signal from the supply circuit 14 along line 34 and provides a pulsed frequency signal, generally in the form of a square wave, along line 36 to the high voltage circuit 12. The square wave signal from the oscillator circuit 16 is provided through a coupling transformer (not shown) to a pair of power switching transistors (not shown) which, via conventional phase control techniques, regulate the amount of current supplied to the primary coil of the main step down transformer for each half cycle of the AC waveform. The step down transformer converts the high voltage signal on its primary coil to a low voltage, high current signal at its secondary coil and applies this signal to the constant current supply circuit 18 along line 38. The duty cycle of the pulse width modulator signal from the oscillator circuit 16 thus controls a level of charging current applied to the battery 22. The pulse width modulation approach minimizes the size of the step down transformer required to provide the necessary high current to the current supply circuit 18. PWM oscillator circuit 16 also includes a soft start circuit (not shown) for gradually ramping up the duty cycle of the PWM oscillator circuit 16 when the charging sequence is initiated.

When the microcomputer 24 initiates a charging sequence by applying a signal on line 48 to the current supply circuit 18, charge current is applied to the battery 22 through the low voltage constant current supply circuit 18 along line 42. The current supply circuit 18 preferably includes a reverse polarity detection circuit (not shown) which protects the circuit 10 from damage in the event that the battery 22 is inserted backwards. The battery current is sensed along line 44 by charge current monitoring circuit 20. If the charge current varies from the predetermined level, the charge current monitoring circuit 20 will provide an output on line 46 to the PWM oscillator circuit 16. The PWM oscillator circuit 16 will then alter the duty cycle of the square wave signal to the high voltage circuit 12 in order to alter the current charge current appropriately. Likewise, at the end of the high current charging sequence, the microcomputer 24 produces an output signal on a charge/trickle line 48 to switch to a trickle charge mode.

The temperature check circuit 26 provides a circuit for monitoring battery temperature. The dotted line 50 from the temperature check circuit 26 represents a heat sensing device, such as a thermistor, that is physically located adjacent the position of the battery 22 when it is plugged into the charger to sense the temperature of the battery 22. The temperature check circuit 26 determines when the battery temperature exceeds a predetermined threshold value and in such event sends a signal along line 52 to the microcomputer 24. The microcomputer 24 then sends a signal on line 40 to halt the charging.

In order to enable the microcomputer 24 to monitor the charging sequence to determine the inflection points in the charging curve of FIG. 1, it is necessary to convert the analog battery voltage signal to a digital signal. Therefore, an analog-to-digital converter must be incorporated. The analog-to-digital converter 30 receives the analog battery voltage on line 54 and produces a timing signal on line 56 which the microcomputer 24 uses to determine the battery voltage value.

Inflection points in the charging curve are determined by monitoring the slope of the curve to detect when the slope reaches a minimum value or maximum value; i.e., when the rate of change in the slope value changes from negative to positive or from positive to negative. In practice, this is accomplished by taking the difference between successive voltage readings and determining when the difference reaches a minimum or maximum value. Accordingly, it can be appreciated that in region II of the charge curve where the difference between successive voltage readings is relatively small, the presence of random noise in the sampled signal can have an adverse impact on the performance of the system and, in particular, the ability of the system to accurately detect the first inflection point A. Thus, in order to improve the gain of the system and thereby enhance the effective signal-to-noise ratio in region II, it is desirable to increase the sampling interval over which the slope is determined.

However, once the charging process has entered region III, the relative effect of noise on the signal is reduced since the voltage in this region is increasing relatively quickly and, therefore, the difference in successive voltage readings is relatively large. Moreover, region III is traversed fairly rapidly and, therefore, it is desirable to provide a relatively short sampling interval so that inflection point B is reliably and rapidly identified.

One proposed method of satisfying both of these requirements is to sample the battery voltage at variable time intervals depending on which region the charging sequence is traversing. In particular, a first embodiment of the present invention comprises a charging system that is adapted to sample voltage values over relatively long time intervals in region II, and then sample voltage values at shorter time intervals in region III. In other words, to improve the effective signal-to-noise ratio in region II, and thus reduce or eliminate the possibility of a false detection of inflection point A and possibly of inflection point B as well, and further, to provide an adequately fast sample rate in region III, the present invention proposes to change the sample rate between the low gain region of region II, where noise is more problematic, and the high gain region of region III.

Figure 3:
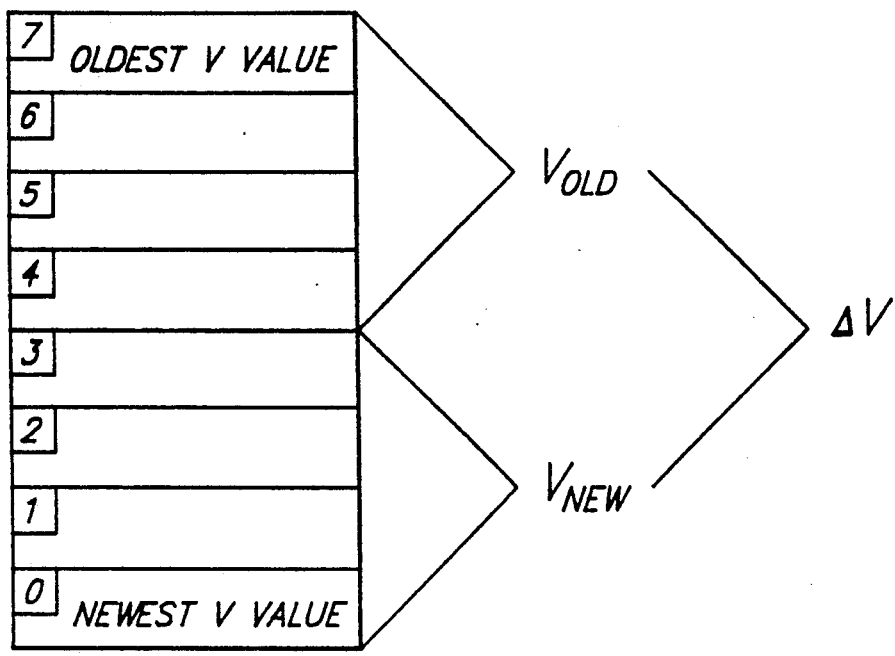
FIG. 3 is an illustration of a computer stack profile for storing voltage values during one region in the charging sequence.

This proposition can be graphically illustrated. Turning to FIG. 3, an illustration of a first-in first-out (FIFO) stack in the memory of the microcomputer 24 is shown. As the charging system monitors the battery voltage while the battery 22 is being charged as discussed above, each sampled voltage value (V) is pushed onto the stack such that the newest voltage value is put in the zero position of the stack and the oldest voltage value which was in the seventh position of the stack is pushed out of the stack and discarded. In this manner, each of the eight most recent sampled voltage values are stored in the stack consecutively in time. It is noted that the stack could include any number of desirable storage locations within the scope of the hardware used. In a preferred embodiment, the voltage samples are taken in region II once every 15 seconds such that voltage data in the stack corresponds to the previous one minute and 45 seconds of charging.

To determine the status of the battery charging sequence, the slope of the charge curve is calculated by first obtaining an old voltage value ($V_{OLD}$) and a new voltage value ($V_{NEW}$), and then subtracting $V_{OLD}$ from $V_{NEW}$ to get a voltage difference ($\Delta V$) between the two voltage values. According to one preferred embodiment, $V_{OLD}$ is calculated as an average voltage value of the four oldest voltage samples in the stack, and $V_{NEW}$ is calculated as an average of the four most recent voltage samples in the stack. The microcomputer 24 is programmed to calculate voltage values as an average of several voltage readings to further reduce the effects of random noise.

Once the difference between and $V_{OLD}$ and $V_{NEW}$ is calculated, the difference value ($\Delta V$), which corresponds to slope, is compared to a previously calculated difference value. If the charging process has yet to reach the first inflection point A, the microcomputer 24 is programmed to determine whether the latest $\Delta V$ value is less than the smallest previously calculated $\Delta V$ value. If it is, the new $\Delta V$ value is stored and the previous $\Delta V$ value discarded. This process is continued until the newly calculated $\Delta V$ value exceeds the stored $\Delta V$ value by a predetermined amount, thus indicating that the slope of the charging curve has ceased to decrease and has begun to increase.

Once inflection point A in the charging sequence has been detected, the charging sequence then enters region III of the charging curve. Region III is a region of high gain and as such will be traversed relatively rapidly. Therefore, it is important that the sample rate be increased from that of region II. Consequently, in a first preferred embodiment, the microcomputer 24 is programmed to begin sampling the battery voltage once approximately every seven seconds so that the voltage data in the stack corresponds to the previous 50 seconds of charging. In other words, once inflection point A is detected, the battery voltage values are pushed onto the stack at twice the rate used in region II, thus increasing the resolution of the system to enable the prompt detection of inflection point B. The same procedure described above for calculating slope in region II is also used in region III, with the exception that the highest observed $\Delta V$ value is stored and compared with each successive new $\Delta V$ value until a decrease in the rate of change in the slope value is observed. When this occurs, the second inflection point B has been detected and the fast charging of the battery is terminated, and the controller automatically switches to the trickle-charge mode.

While the above-described process successfully improves the signal-to-noise ratio in region II while providing appropriately high resolution in region III, it does create a "blind-spot" in the charge curve analysis. In particular, when the controller switches to the faster sample rate after the detection of the first inflection point A, all of the voltage data accumulated in the stack during region II must be "flushed" in order to provide proper data analysis. In other words, it will be appreciated that if voltage values sampled every 15 seconds are averaged with voltage values sampled every seven seconds, inaccurate slope calculations would result. Accordingly, the above-described process necessarily entails a transition period following the detection of the first inflection point A when the contents of the voltage data stack are discarded and then subsequently filled with new voltage data before the slope calculations can resume. Therefore, in the above preferred embodiment, at least a 50-second "blind spot" is created in the charge curve analysis. In order to overcome this deficiency in the first described embodiment, a second preferred embodiment is disclosed which accomplishes the advantages of the present invention without changing the actual battery voltage sampling rate between regions II and III.

Figure 4:
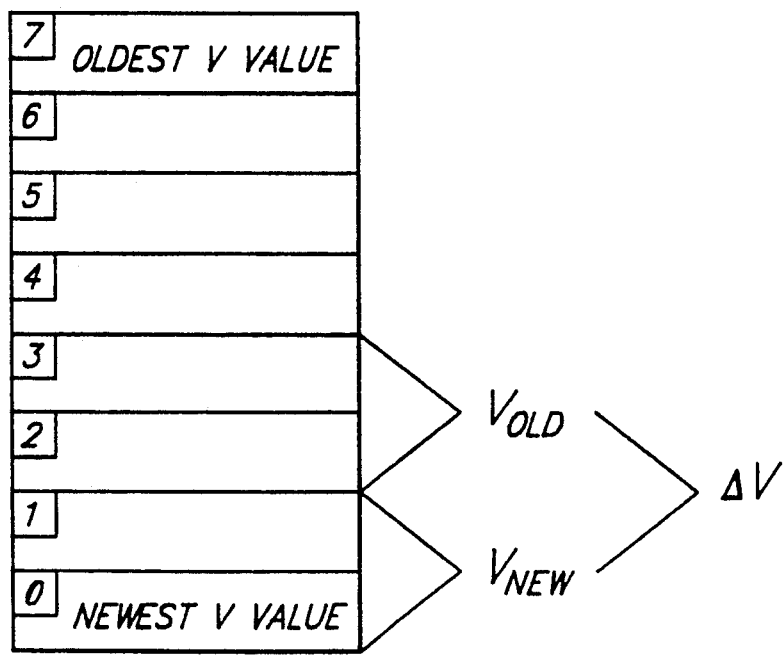
FIG. 4 is an illustration of a computer stack profile for storing voltage values during a second region in the charging sequence.

In particular, in an alternative preferred embodiment of the present invention, a constant 15-second sample rate is used throughout. In region II, the microcomputer 24 is programmed to calculate $V_{OLD}$, $V_{NEW}$, and $\Delta V$ as described above and illustrated in FIG. 3 using all eight voltage values in the stack. However, once the first inflection point A is detected, the microcomputer 24 is programmed to change the procedure for calculating the values of $V_{OLD}$ and $V_{NEW}$. With particular reference to FIG. 4, in region III the value of $V_{NEW}$ is calculated as the average of the newest sampled voltage value ($V_0$) and the next most recent sampled ($V_1$), and $V_{OLD}$ is calculated as the average of voltage values $V_2$ and $V_3$. Consequently, the effective sampling period for calculating slope in region III is reduced by half relative to the sampling period used in region II, without changing the actual sample rate at which voltage readings are taken. Accordingly, there is no need to discard the accumulated voltage readings in the data stack when the transition is made, thereby eliminating the blind spot in the analysis associated with the first embodiment.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A method of charging a battery, said method comprising the steps of:

periodically sampling a measured voltage value of the battery during a charging sequence that includes a first predetermined interval characterized by a relatively low rate of increase in battery voltage and a second predetermined interval characterized by a relatively high rate of increase in battery voltage;

storing a predetermined number of consecutive voltage samples;

calculating an average voltage value from the stored voltage samples in order to determine the status of the charging sequence; and changing the effective period over which said average voltage value is calculated as the charging sequence proceeds from said first predetermined interval to said second predetermined interval in the charging sequence.

2. The method according to claim 1 wherein the step of calculating said average voltage value includes the steps of selecting a plurality of stored voltage samples and calculating said average voltage value from said selected plurality of stored voltage samples.

3. The method according to claim 1 wherein the step of changing the effective period includes sampling and storing the battery voltage value at a first sample rate when the charging sequence is in said first predetermined interval, and sampling and storing the battery voltage value at a second shorter sampling rate when the charging sequence is in said second predetermined interval.

4. The method according to claim 1 wherein the step of changing the effective period includes sampling the battery voltage at a constant rate and calculating said average voltage value from selected stored voltage samples which were sampled over a first time period during the first predetermined interval and from selected stored voltage samples which were sampled over a second time period during the second predetermined interval, and further wherein said second time period is shorter than said first time period.

5. The method according to claim 1 wherein the step of storing a predetermined number of battery voltage samples includes the step of storing the battery voltage samples in a first-in, first-out computer stack, wherein the most recent voltage sample is pushed onto the stack and the oldest voltage sample is pushed off of the stack at each sample period.

6. The method of claim 1 wherein the resulting battery voltage versus time charging curve from the charging sequence defines an inflection point that comprises the boundary between said first and second predetermined intervals, and further wherein said calculating step includes calculating first and second average voltage values from first and second selected pluralities of stored voltage samples and calculating from said first and second average voltage values the slope of the battery voltage versus time charge curve to determine the status of the charging sequence.

7. An apparatus for charging a battery by applying a charging current to the battery and monitoring the battery voltage during a charging sequence that includes a first predetermined interval characterized by a relatively low rate of increase in battery voltage and a second predetermined interval characterized by a relatively high rate of increase in battery voltage said apparatus comprising:
sampling for periodically sampling measured voltage values of the battery;
a memory for storing a predetermined number of consecutive voltage samples; and
controller means connected to said sampling means and said memory for calculating an average voltage value from the stored voltage samples and determining from said average voltage value the status of the battery charging sequence;
said controller means further changing the effective period over which said average voltage value is calculated as the charging sequence proceeds from said first predetermined interval to said second predetermined interval in the charging sequence.

8. The apparatus according to claim 7 wherein a controller means selects a plurality of stored voltage samples and calculates said average voltage value from said selected plurality of stored voltage samples.

9. The apparatus according to claim 7 wherein said controller means causes said sampling means to sample the battery voltage value at a first sample rate when the charging sequence is in said first predetermined interval and at a second shorter sampling rate when the charging sequence is in said second predetermined interval.

10. The apparatus according to claim 7 wherein said sampling means samples the battery voltage at a constant rate and said controller means calculates said average voltage value from selected stored voltage samples which were sampled over a first time period during said first predetermined interval and from selected stored voltage samples which were sampled over a second time period during said second predetermined interval, and further wherein said second time period is shorter than said first time period.

11. The apparatus according to claim 7 wherein said memory stores a predetermined number of battery voltage samples in a first-in, first-out computer stack such that the most recent battery voltage sample is pushed onto the stack and the oldest battery voltage sample is pushed off of the stack at each sample period.

12. The apparatus of claim 7 wherein the resulting battery voltage versus time charging curve from the charging sequence defines an inflection point that comprises the boundary between said first and second predetermined intervals.

13. The apparatus of claim 12 wherein said controller means comprises a microprocessor that is programed for calculating first and second average voltage values from first and second selected pluralities of stored voltage samples, and for calculating the slope of the battery voltage versus time curve from said first and second average voltage values.

14. A method of controlling the charging of a rechargeable battery by monitoring the battery voltage during the charging sequence, the resulting battery voltage versus time charging curve from the charging sequence being characterized by a first region where the rate of increase in the battery voltage is relatively low and a second region wherein the rate of increase in the battery voltage is relatively high, said method comprising the steps of:
periodically sampling at a substantially constant rate of voltage of the battery during the charging sequence;
storing a predetermined number of consecutively sampled battery voltage values; and
determining the status of the charging sequence from said stored voltage samples using stored voltage samples which were sampled over a first time period during said first region and using stored voltage samples which were sampled over a second time period shorter than said first time period during said second region.

15. The method of claim 14 wherein said step of determining the status of the charging sequence includes calculating the slope of the battery voltage versus time charging curve.

16. The method of claim 15 wherein said step of calculating the slope includes the steps of calculating a first voltage value from the average of a first selected plurality of said stored battery voltage samples, calculating a second voltage value from the average of a second selected plurality of said stored battery voltage samples, and calculating the difference between said first and second voltage values.

17. The method of claim 16 wherein said first and second voltage values are calculated from stored battery voltage samples that are sampled over said first time period when the charging sequence is in said first region, and from stored battery voltage samples that are sampled over said second shorter time period when the charging sequence is in said second region.

18. The method of claim 17 wherein said first and second voltage values are calculated from the average of twice the number of consecutive stored battery voltage samples in said first region than used in said second region.

19. The method of claim 17 wherein the boundary between said first region and said second region is defined by an inflection point in the battery voltage versus time charging curve.

* * * * *

UNITED STATES PATENT AND TRADEMARK OFFICE
CERTIFICATE OF CORRECTION

PATENT NO. : 5,268,630
DATED : December 7, 1993
INVENTOR(S) : Daniele C. Brotto et al It is certified that error appears in the above-indentified patent and that said Letters Patent is hereby corrected as shown below:

Column 9, line 48, claim 8, "a" should be --the--.

Column 10, line 29, claim 14, "of" (first occurrence) should be --the--.

Signed and Sealed this

Tenth Day of January, 1995

Attest:

BRUCE LEHMAN

Attesting Officer

Commissioner of Patents and Trademarks